United States Patent [19]

Black et al.

[11] Patent Number: 4,998,215

[45] Date of Patent: Mar. 5, 1991

[54] APPARATUS AND METHOD FOR CONVERTING VIDEO INFORMATION FOR PRINTING BY A STANDARD PRINTER

[75] Inventors: Vonn L. Black; Gary D. Zimmerman, both of Colorado Springs, Colo.

[73] Assignee: Hewlett-Packard Company, Palo Alto, Calif.

[21] Appl. No.: 306,598

[22] Filed: Feb. 1, 1989

[51] Int. Cl.$^5$ ............................................... G06K 1/00
[52] U.S. Cl. ...................................... 364/519; 358/296
[58] Field of Search .......................... 364/518–520, 364/235 MS File, 930 MS File; 346/154; 358/296, 141, 446

[56] References Cited

U.S. PATENT DOCUMENTS

4,148,066 4/1970 Saylor ................................. 364/519

Primary Examiner—Arthur G. Evans

[57] ABSTRACT

A system is provided in which video information is converted to a format acceptable for printing by a standard printer, which is also capable of printing non-video based information. The system enables the user to provide a hard copy recording of video information that may be changing rapidly. The system includes an apparatus for converting the video information into a format acceptable for printing by the standard printer. Preferably, the conversion technique does not depend on providing synchronization between the display rate of the video display screen of the video information instrument and the sampling of the video information, nor is it necessary that the number of clock samples associated with the horizontal scan be the same for different instruments from which video information can be obtained. To accomplish such objectives, the video information is sampled at a greater rate than the display rate of the video screen. The obtained video information is stored using digital data. The digital data representing the video information is then reconstructed using a dot boundary algorithm and a dot clock synchronization pattern algorithm, together with translation maps that are used to translate serial bit samples into corresponding representations of display dot intensity levels. The reconstructed video information, which represents the display dots, is outputted by the converting apparatus for printing by the standard printer.

26 Claims, 9 Drawing Sheets

| SAMPLES | DISPLAY DOTS TO BE PRINTED |
|---|---|
| 0000 | 00 |
| 0001 | 00 |
| 0010 | 01 |
| 0011 | 01 |
| 0100 | 01 |
| 0101 | 11 |
| 0110 | 11 |
| 0111 | 00 |
| 1000 | 00 |
| 1001 | 01 |
| 1010 | 0 |
| 1011 | 10 |
| 1100 | 0 |
| 1101 | 11 |
| 1110 | 11 |
| 1111 | 11 |

Fig. 5B

| SAMPLES | DISPLAY DOTS TO BE PRINTED |
|---|---|
| 000 | 00 |
| 001 | 00 |
| 010 | 01 |
| 011 | 11 |
| 100 | 01 |
| 101 | 01 |
| 110 | 11 |
| 111 | 11 |

|       |   | • | • |   |
|-------|---|---|---|---|
| ROW 1 |   | • | • |   |
| ROW 2 | • |   |   |   |
| ROW 3 | • |   |   |   |
| ROW 4 |   | • | • |   |

Fig. 6

| 0 | 0 | 1 | 1 | 1 | 1 | 0 | 0 | 0 | 0 |
|---|---|---|---|---|---|---|---|---|---|
| 1 | 1 | 0 | 0 | 0 | 0 | 0 | 0 | 0 | 0 |
| 1 | 1 | 0 | 0 | 0 | 0 | 0 | 0 | 0 | 0 |
| 0 | 0 | 1 | 1 | 1 | 1 | 0 | 0 | 0 | 0 |

| | Fig.10A | Fig.10B |
|---|---|---|
| Row 1 | Samples 0001 1111 1111 0000 0000 | Print: 00 11 11 00 00 |

| | Fig.10C | Fig.10D |
|---|---|---|
| Row 2 | Samples 1110 0000 0000 0000 0000 | Print: 11 00 00 00 00 |

| | Fig.10E | Fig.10F |
|---|---|---|
| Row 3 | Samples 0111 1000 0000 0000 0000 | Print: 11 00 00 00 00 |

| | Fig.10G | Fig.10H |
|---|---|---|
| Row 4 | Samples 0000 0111 1111 0000 0000 | Print: 00 11 11 00 00 |

APPARATUS AND METHOD FOR CONVERTING VIDEO INFORMATION FOR PRINTING BY A STANDARD PRINTER

FIELD OF THE INVENTION

The present invention relates to a system that includes a separate apparatus adapted to be connected to a standard printer for converting video information to a format acceptable to the standard printer.

BACKGROUND OF THE INVENTION

It is often times desirable to be able to provide a hard copy recording of video information outputted by an instrument that develops video signals. By way of example, protocol analyzers such as those made by Hewlett-Packard Company and identified as Model Nos. 4951 and 4952 make extensive use of video attributes such as inverse video, underline, special characters, and half bright. However, a conventional or standard printer, such as an Epson-compatible printer, is not able to accept and provide a hard copy recording of such video information. Rather, a special video printer is required, in order to print the representation of the video information. The special video printer can only be used to print or provide a hard copy recording of video-related information. Other information that is not video based, such as text information or hexadecimal based information, cannot be printed by the special video printer. Consequently, a separate and relatively expensive printer needs to be provided to print video information and another printer is required to print non-video related information. Applications software could be developed which provides printer support for printing some, but not all, video-based information obtained from the afore-mentioned protocol analyzers. However, it would be much more desirable to provide a solution that supports all of the operating modes of the aforesaid protocol analyzers and is able to provide an instantaneous hard copy or "snapshot" of the display.

In conjunction with devising a solution whereby a specialized video printer is not required to print video-related information, it would be advantageous to provide an accurate hard copy representation of the video information outputted by different instruments. Such instruments, however, differ in the number of dots or pixels that are displayed for each row that forms a part of the display screen. Consequently, it is difficult to devise a phase locked loop (PLL) circuit solution since such a circuit would require information relating to the number of dots provided on the display screen. Stated another way, a PLL-based solution is too dependent on the video information provided by a particular instrument and a more desirable solution is one that is independent of the video information provided by a particular instrument. Another possible solution for converting the video information to a format suitable for a conventional printer might involve reliance on the occurrence of dots on the display screen having a certain predetermined intensity whereby such dots having the predetermined intensity can be detected by a system and this information utilized to convert the video information to an acceptable format. This technique, however, would depend greatly on the occurrence of dots on the display screen having at least a predetermined intensity. If such dots did not occur with sufficient frequency, the accuracy of the representation of the video information would be diminished due to insufficient information or samples of the dots having the predetermined intensity.

It would be beneficial, therefore, to provide an apparatus that interfaces between an instrument outputting video information and a standard printer and which apparatus can be used with different instruments to provide a hard copy or snapshot of the display screen of whichever instrument is connected to the apparatus. Further, it would be worthwhile to provide such an apparatus at a relatively low cost while such apparatus could also convert all video information on the display screens to a format suitable for the standard printer and, particularly, for use with the protocol analyzer Model Nos. 4951 and 4952 of Hewlett-Packard.

SUMMARY OF THE INVENTION

The system of the present invention converts video information to a format acceptable for printing by a conventional printer. That is, a special video printer is not necessary to print the video information. The system includes an instrument for providing video information. In one embodiment, the instrument includes a protocol analyzer, such as those available from Hewlett-Packard Company and identified by Model Nos. 4951 and 4952. The instrument communicates with a video information converting apparatus that converts the video information to a format, such as a standard graphics format, for subsequent printing. The system also includes the conventional printer, which can also be used to print non-video information when not being used with the converting apparatus of the present invention. In one embodiment, the standard printer is an Epson-compatible printer. When not being used with the converting apparatus, the Epson-compatible printer accepts a variety of formatted information including text based information and hexadecimal based information for providing the desired, printed output.

More particularly, the video information converting apparatus includes synchronization or sync determining circuitry for identifying horizontal and vertical syncs associated with the display screen of the video information-based instrument. The horizontal and vertical syncs constitute synchronizing information received from the instrument and indicate the end of a row of displayed information and the end of the last row of displayed information, respectively. The sync determining circuit outputs synchronizing information signals to a processing system of the converting apparatus to inform the processing system when a horizontal scan and/or vertical scan of the display screen have been completed. The converting apparatus also includes comparator circuitry for comparing the levels or intensity of the information displayed on the screen with predetermined levels. The displayed information can be defined in the form of dots or pixels. In the preferred embodiment, the dots have one of a possible three levels of intensity, namely, full bright, half bright, and no bright, where half bright is characterized by having one-half of the intensity level of full bright and no bright indicates a blank or no intensity dot.

The processing system clocks and receives the video information, represented by the different levels of intensity, to convert it to a digital representation. The digital representation of the video information is stored in digital memory. The memory communicates with the processing system and the digital data representative of the video information is stored in memory in accordance with the rows and columns configuration of the display screen. That is, the various rows and columns of the display screen have corresponding rows and columns in the memory. The processing system includes counters that are controlled using the horizontal and vertical syncs to properly store the digital representations in the predetermined memory locations.

In a preferred embodiment, the processing system clocks or samples the video information at a rate greater than three times the dot clock rate, with the dot clock rate corresponding to the rate at which the display screen is updated. In one particular embodiment, the dot clock rate is 5.07 MHz and the sampling rate utilized by the processing system for sampling the display screen is 16 MHz. In the present invention, the sampling clock is not synchronized to the beginning or start of a dot signal, with the dot signal having a predetermined intensity or voltage depending upon whether it is full bright, half bright or blank. Because there is a lack of synchronization, the display screen dot is typically sampled at different times during the occurrence or existence of the analog signal representing the dot. That is, the start of a sampling pulse of a sampling clock may occur sometime after the initial occurrence of the intensity level that represents a dot. Depending upon when the start of a sampling pulse occurs relative to the start of the dot representation, for any one dot representation, the same dot on the display screen may be sampled 2, 3 or 4 times. Regardless of the number of times that a particular display dot is sampled, each time sampling occurs, a digital representation thereof is stored in memory. However, because display dots are typically represented by varying samples of 2, 3 or 4, it is necessary to provide a reconstruction of the stored video information so that it accurately represents the display screen. The reconstructed information can then be printed by the standard or conventional printer. The reconstruction utilizing the sampled video information involves a number of steps. First, an algorithm for setting dot boundaries is utilized. In particular, a determination is made as to when a change occurred between a dot of one intensity level and a dot of another intensity level. For example, a dot boundary exists between a full bright dot and a blank dot on the display screen. In the preferred embodiment, the digital representation of the full bright dot includes logical ones for each of the times that the dot was sampled and a blank dot is digitally represented using logical zeros. The half bright dot is digitally represented using alternating logical ones and zeros. For each horizontal row of the display screen, each dot boundary is identified and the resulting dot boundaries can be defined using a single row of logical ones and zeros, representative of the dot boundaries of all of the rows of the display screen. More specifically, a logical one in one of the columns of the single row of dot boundary information indicates that, for at least one of the rows of the digital representations of the sampled video information, a dot boundary exists; while a logic zero in a column of the dot boundary representation or row indicates that there was no dot intensity change in any of the rows of the sampled data for that particular column.

After identifying the dot boundaries, an algorithm is utilized for providing dot clock synchronization between recoverable dot boundaries. In particular, the single row dot boundary row is utilized to develop a row of logical ones and zeros and which can be used to reconstruct the dots, which are currently digitally represented in memory by the sampled digital data. This algorithm basically accomplishes this function by checking whether or not the sampled digital representations of the video information include a predetermined number of sequential logical ones or, alternatively, a predetermined number of sequential logical zeros. Depending upon which is present, the digital representation of the dot boundaries is modified to obtain a digital representation of the dot clock synchronization. The resulting dot clock synchronization is used, together with the sampled digital representations, to reconstruct the video information for subsequent printing. That is, a bit of the dot clock of the synchronization pattern is applied to corresponding sampled bits stored in memory for each of the rows of the display screen to identify and select a predetermined number of sequential samples from those stored in memory. From the sample, using a translation map stored in memory, a dot having the proper intensity level is obtained. More particularly, for each set of samples identified, there is a corresponding dot representation. In the preferred embodiment, for each set of samples, representative of a dot on the video instrument display screen, two dots are printed or recorded using the printer. Further, the translation map includes two binary numbers representative of the corresponding samples. In the preferred embodiment, a pair of logical zeros indicates a blank dot, a pair of logical ones indicates a full bright dot and a logical zero and a logical one (or logical one and logical zero) indicate a half bright dot so that when the screen display dot is printed, two corresponding dots are printed for each dot displayed on the screen.

The system also includes conventional interface hardware, which provides communication between the instrument and the converting apparatus, as well as between the conventional printer and the output of the converting apparatus. Preferably, power for the converting apparatus is obtained using power from the conventional printer. The converting apparatus also includes power circuitry, which is controllable using the processing system to reduce power consumption by the converting apparatus. In one embodiment of the system, the processing system turns off the power to the analog circuitry of the converting apparatus including the sync determining circuitry and the comparator circuitry during the time that the sampled video data, previously stored in memory, is being reconstructed for outputting to the conventional printer. In the preferred embodiment, the previously stored sampled video data is outputted to the printer before a subsequent sampling of the display screen is made.

In view of the foregoing summary, a number of important features of the present invention are readily discerned. A system is disclosed for printing video information using a conventional printer, such as an Epson-compatible printer. A special, relatively expensive, with limited usage, video printer is not required. The system includes a novel converting apparatus, which interfaces between an instrument for providing video information and the conventional printer. The converting apparatus enables the user to use a conventional printer both as a video printer and a printer for recording or printing non-video information. Consequently, two separate printers are not required. The converting apparatus can be used with different instruments, which output the video information, and yet provides suitable formatted data for printing by the conventional printer. Furthermore, in implementing the converting functions, dependency on the occurrence of the video information has been eliminated so that, regardless of the number of samples taken as a result of a horizontal scan of the display screen, an accurate representation of the display dots can be reconstructed for subsequent printing. The converting apparatus also includes circuitry for reducing power consumption by the analog circuitry of the apparatus when data is being transmitted to the printer for printing.

Additional advantages of the present invention will become readily apparent from the following discussion, particularly when taken in conjunction with the accompanying drawings.

DETAILED DESCRIPTION

Figure 1:
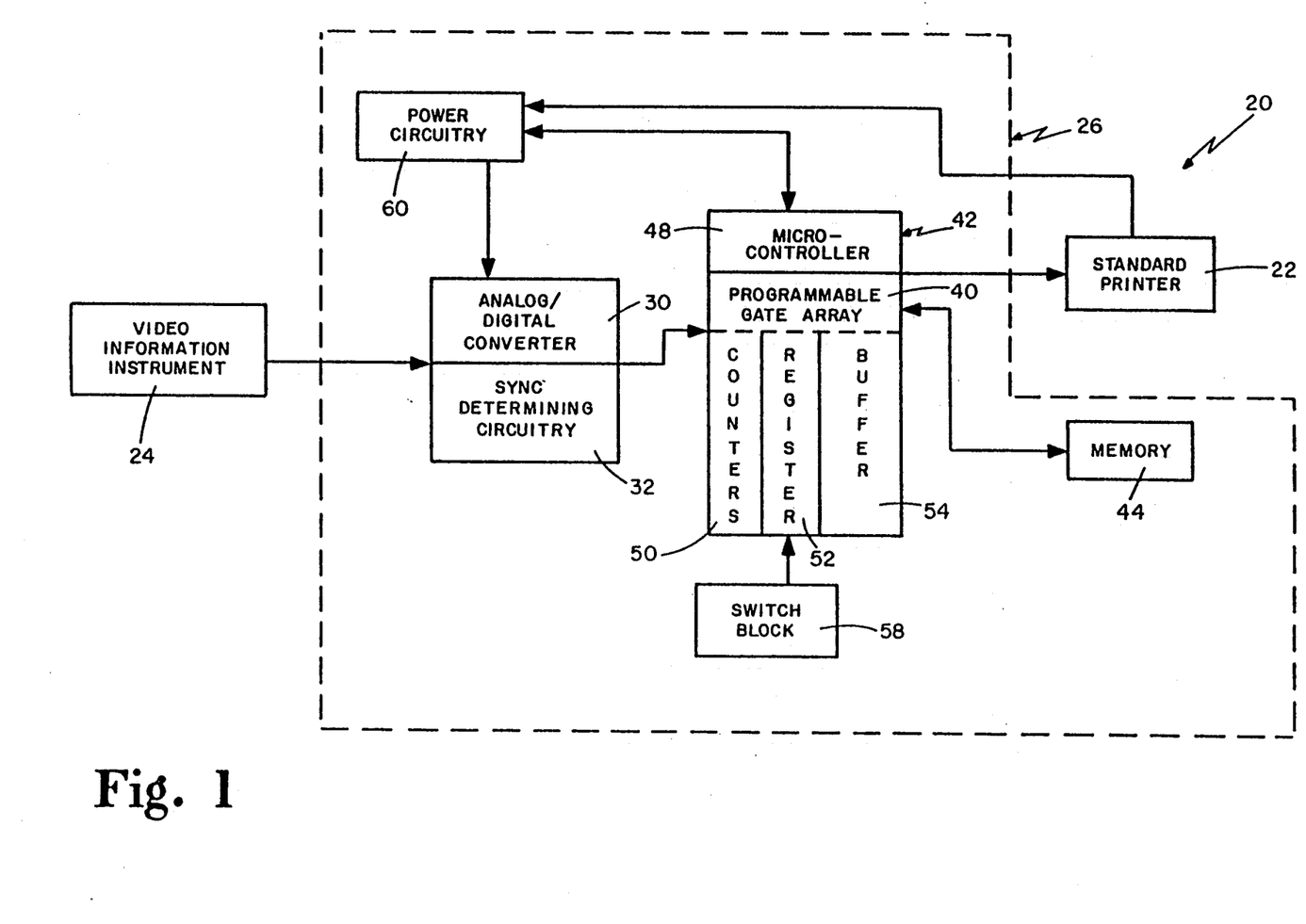
FIG. 1 is a block diagram of the present invention.

In accordance with the present invention and with reference initially to FIG. 1, a system 20 is disclosed for providing the capability of rendering a hard copy recording of video information. The system 20 is characterized by the fact that a standard or conventional printer 22 is used to print the video information and provide the hard copy recording. The standard printer 22 is also able to print information other than video information including hexadecimal-based information and text-based information, as well as other non-video information. The standard printer 22 is preferably an Epson compatible printer. The system 20 also includes a video information instrument 24, which outputs video information or data that it generates. In a preferred embodiment, the video signals are produced by protocol analyzers available from Hewlett Packard and identified by Model Nos. HP 4951 and HP 4952. Each of these protocol analyzers output RS-170 video signals. The video signals or information are outputted via a RS-170 connection to a converting apparatus 26 that converts the video information to a format acceptable for printing by the standard printer 22. In a preferred embodiment, the converting apparatus 26 converts the video information to a standard graphics format compatible for printing by the standard printer 22. The output of the converting apparatus 26 is transmitted to the standard printer 22 utilizing a conventional RS-232 connection. Power for the converting apparatus 26 is supplied by the standard printer also using the RS-232 connection. The standard printer 22 is therefore able to capture a clear hard copy image of the video information, such as that found on a video display screen of the video information instrument, when the instrument 24 is displaying real-time data at a high rate. In connection with the Hewlett Packard protocol analyzers, such a rate is about 64 kbps. It should also be appreciated that the converting apparatus 26 could output the formatted data acceptable for printing by the standard printer 22 to a DOS file, instead of obtaining an immediate printout or recording. The DOS file is able to store the video information for possible subsequent printing for observation or inspection.

Figure 2:
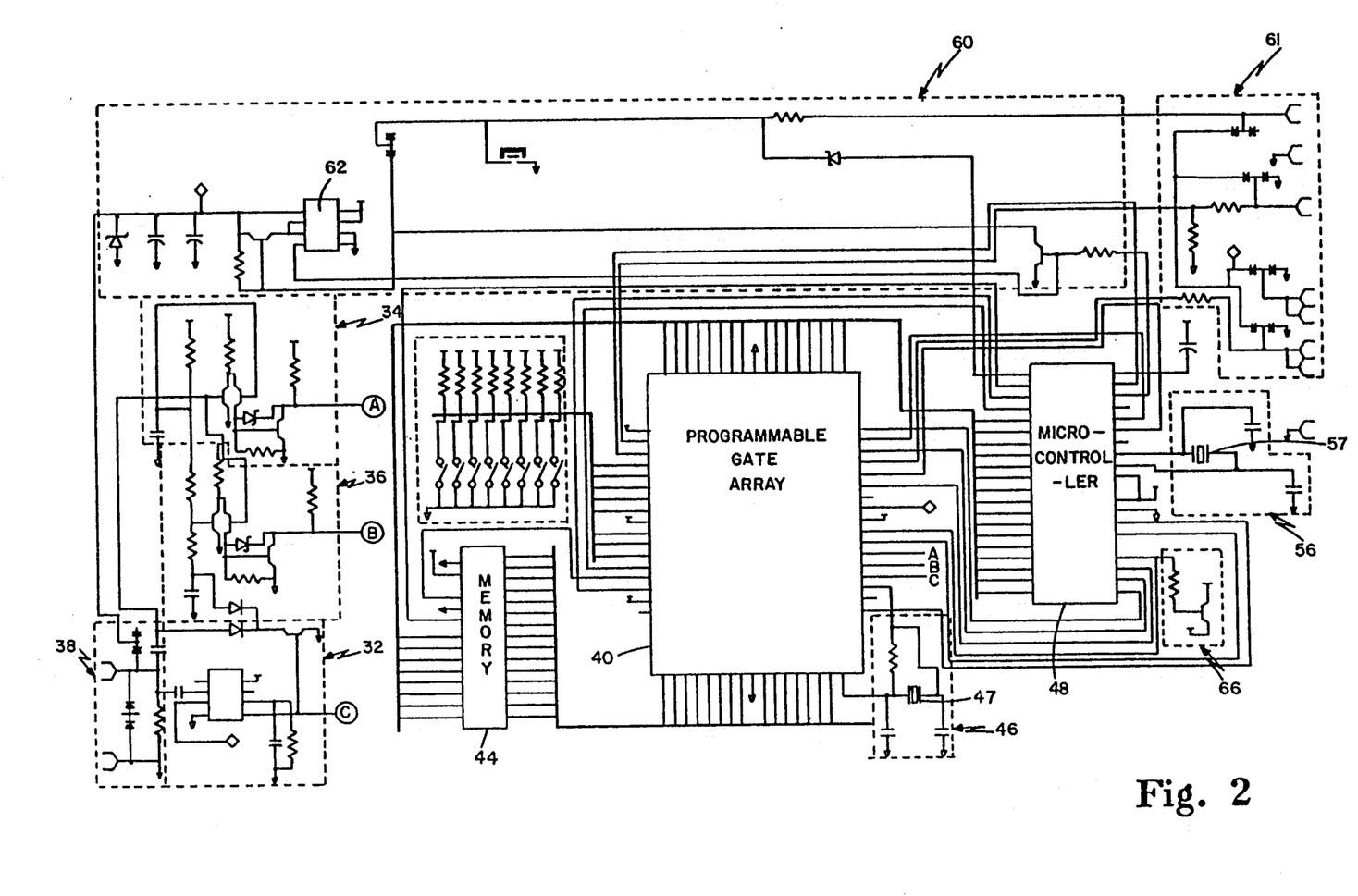
FIG. 2 is a schematic diagram of the converting apparatus of the present invention.

With reference also to FIG. 2, the converting apparatus 26 is described in greater detail. The converting apparatus 26 includes hardware that is separately contained in a suitable housing apart from the standard printer 22 but electrically communicates therewith using the RS-232 connection. Consequently, the user is able to readily interconnect circuit terminals of the converting apparatus 26 to the standard printer 22, as well as the video information instrument 24. With respect to the input, the RS-170 connector transmits video information in the form of a standard RS-170 video signal, to an analog-digital converter 30 and a sync determining circuit 32. The video information transmitted can be defined in the form of display dots that make up the image found on the video display screen, for example, of the video information instrument 24. With regard to the Hewlett Packard protocol analyzers, in one embodiment, there are display dots having three different levels of intensity. The levels of intensity are denoted as full bright and half bright, with the lack of intensity being defined as a blank dot. Such levels of intensity have corresponding signal amplitudes or voltages associated therewith. In particular, the voltage associated with the full bright dot is typically twice the voltage or signal level associated with a half bright dot, while the blank dot is represented by a signal of zero voltage.

The analog-digital converter 30 receives the analog video information or signal and converts it to a digital signal indicative of whether the current video information or display dot is full bright, half bright or blank. As FIG. 2 illustrates, the analog/digital converter 30 includes a pair of comparator circuits 34, 36. The comparator circuits 34, 36 are conventionally designed circuits readily understood by those skilled in the art and include conventionally arranged transistors, zener diodes, resistors and capacitors. Each of the comparators 34, 36 receives the video signal from the video instrument 24 using the conventional input coupling circuitry 38 (RS-170 connection), which applies the video signal to the sync determining circuit 32 and compares its amplitude to a predetermined voltage corresponding to an intensity level of full bright or half bright. In the case of the comparator 34, the predetermined voltage corresponds to a full bright condition while the predetermined voltage of the comparator 36 corresponds to a half bright intensity level. Consequently, the comparator 34 outputs a digital binary one whenever the video signal corresponds to the predetermined voltage magnitude, which is also applied to the comparator 34. Similarly, the comparator 36 outputs a digital binary one whenever the inputted video signal corresponds to a dot having a half bright intensity level. The differentiation between the full bright and half bright states of dots will be explained later in greater detail. The digital signals representative of the inputted video information are sent to a programmable gate array 40 of a processing system 42. Also inputted to the programmable gate array 40 are vertical and horizontal sync information or signals outputted by the sync determining circuit 32. The sync determining circuit 32 is a conventional circuit that strips the horizontal and vertical syncs associated with the video information provided on a video display screen, for example, for use by the processing system 42 in controlling the sampling of the video information. The horizontal sync provides an indication as to when a row of the display screen has been completely accessed or sampled while the vertical sync provides an indication that there has been a complete sampling of the entire display screen.

The preferred embodiment of the converting apparatus 26 samples the inputted video signal asynchronously to the video dot clock, which is the clock that is involved in the updating or changing of the display dots. More specifically, in the embodiment including the Hewlett Packard protocol analyzers, the display dots are updated at a frequency of 5.07 MHz. The converting apparatus 26 is not synchronized to this dot clock rate. Rather, it asynchronously samples the video information or display dots at a rate greater than this dot clock rate and, preferably, greater than three times the dot clock rate. In one embodiment, the rate at which the display dot or video information is sampled has a frequency of 16 MHz, which frequency is generating using conventional clocking circuitry 46 that includes a piezoelectric element 47. Consequently, because the sampling frequency is not synchronized to the video dot clock and because the sampling rate is three times greater than the dot clock rate, during any one particular display of video dots, the converting apparatus 26, using the programmable gate array 40, samples each dot on an average of three times, with some of the dots possibly being sampled only two times while other of the dots possibly being sampled four times. Since not all video dots are sampled the same number of times, the sampled video information must be subsequently reconstructed in order to provide an accurate representation of the actual video information. This is accomplished, as will be explained later, by the implementation of certain algorithms and translation maps or look-up tables that result in an accurate conversion to a standard graphics format corresponding to the inputted video dots or information.

Before reconstruction, the digital signals outputted by the comparators 34, 36 are stored in memory 44 under control of the programmable gate array 40. The memory 44 is, preferably, a random access memory (RAM), which receives eight bits or one byte of video information at one time from the programmable gate array 40. The digital bits representative of the video information are inputted in sequential order to the memory 44 based on the row and column video dot matrix received from the video information instrument. In particular, the processing system 42 also includes a microcontroller 48 in communication with the programmable gate array 40 for controlling its operation. The programmable gate array 40 waits for a signal from the microcontroller 48 in order to synchronize to the vertical retrace and sample the ensuing frame of video dots or information associated with the display screen of the video information instrument 24. In connection with its operation, conventional clocking circuitry 56 including a piezoelectric element 57 communicates with the microcontroller 48 to provide a clock signal at a suitable frequency to the microcontroller 48. Once the gate array 40 begins to sample, due to receipt of the vertical sync signal, digital representations of the video dots are stored sequentially by column and then row. That is, the first video dot of the first column of the frame being sampled is initially stored and then subsequent digital bits representative of subsequent columns of the video dots are stored and this continues until the first row of video dots is stored. After the first row is completed, the memory 44 then receives and stores digital bits associated with the columns of the second and subsequent rows of the video dots that define the display on the video screen. In one embodiment, the display screen of the video information instrument includes 256 columns of video dots and 224 rows of video dots. The number of times that each video dot is sampled for a particular one display of video information varies between 2 and 4 times. Consequently, the number of bytes for any row of video information can also vary. The greater the number of times a particular video dot is sampled, the greater the number of digital bits are generated, which are representative of that video dot. With respect to the embodiment having 256 dots constituting a row of video information, the number of bytes digitally representing such video dots is less than 128 bytes since 128 bytes would mean that each of the video dots was sampled 4 times each. Since the sampling rate is just greater than 3 times the video dot clock rate, each of the video dots is not sampled 4 times each, but the average is something less than 4 times.

In achieving the desired storage of the digital bit representations of the video information, the programmable gate array 40 also includes a pair of counters 50. One of the counters 50 is used in keeping track of which column video information is currently being sampled while the second of the counters 50 is being used to monitor which of the rows of video information is currently being sampled. The information from the counters 50 is used to properly direct and store the digital representations of the video information at the predetermined locations in the memory 44. The programmable gate array 40 also includes a shift register 52, which receives the digital bits representative of the sampled video information. The register 52 is an 8-bit shift register, which temporarily receives the digital representations of the video information. Once the shift register 52 receives its complement of 8 digital bits representative of video information, it outputs this one byte of information to a buffer 54. The buffer 54, under control of the programmable gate array 40, then sends the byte of the digitally represented video information to the proper storage area in the memory 44.

The programmable gate array 40 also includes digital logic for producing the desired differentiation between full bright and half bright video information. In the case in which a half bright video dot is being sampled, this digital logic causes an alternating binary one/binary zero (or binary zero/binary one) pattern to be stored in the proper location in the memory 44. In the case of the half bright video dot, the digital logic checks to determine whether or not the previously stored digital bit was a binary one or a binary zero and, depending upon which binary representation was previously stored, generates the opposite binary state for subsequent storage. As an example, if the previously generated digital bit outputted by the digital logic was a binary one, the digital logic then outputs a binary zero for storage in the memory 44. As a result, for a half bright video dot, and in the case in which the half bright video dot is sampled three times, the memory location storing the digital representation of this video dot includes binary one binary zero, binary one or binary zero, binary one, binary zero, depending upon the previous output of the digital logic. This alternating pattern contrasts with the binary one pattern that results when a full bright dot is sampled. The no intensity or blank dot is represented in memory by binary zeros. After the memory 44 has stored digital representations of all of the video information on the display screen of the video information instrument 24, the memory 44 includes patterns of binary ones and zeros representative of the sampled video information, with each of the video dots being represented digitally at least two times and as many as four times.

Figure 3:
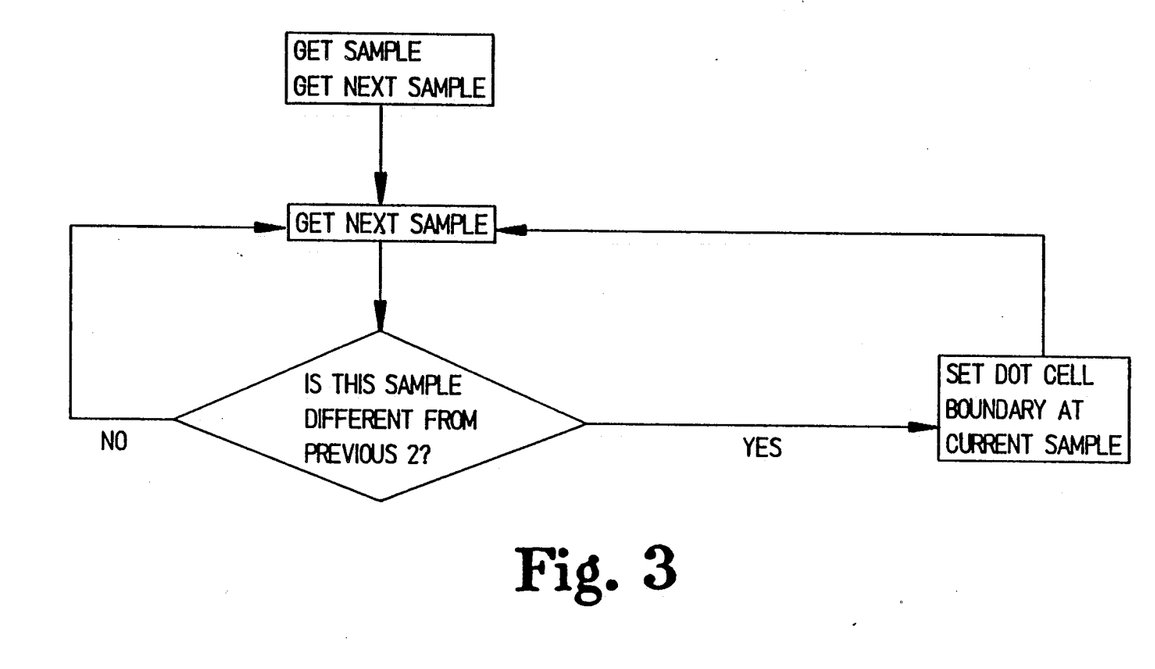
FIG. 3 is a flow diagram for determining dot boundaries.
Figure 4A:
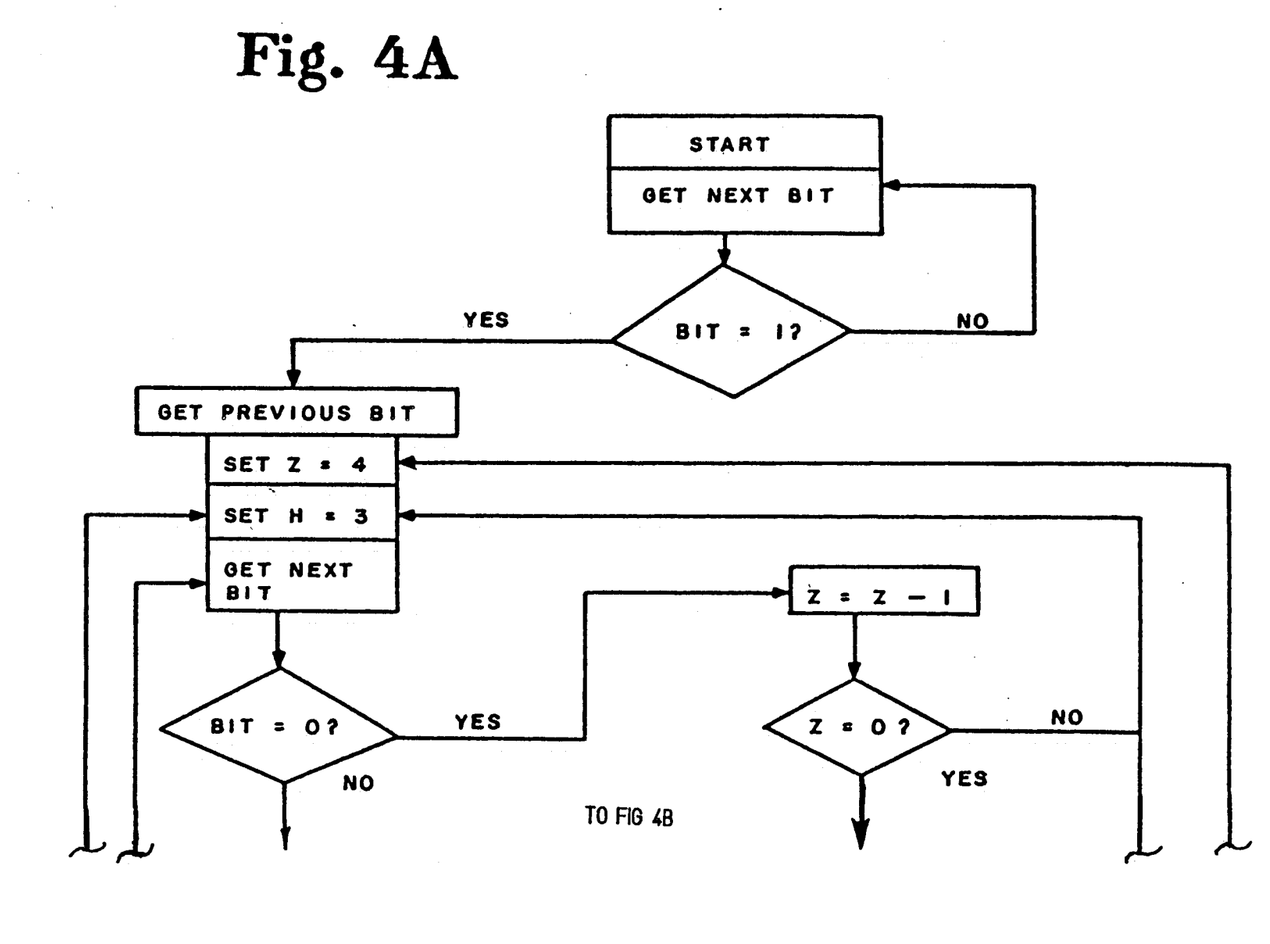
FIG. 4 is a flow diagram for determining a dot boundary synchronization pattern using previously determined dot boundaries.
Figure 4B:
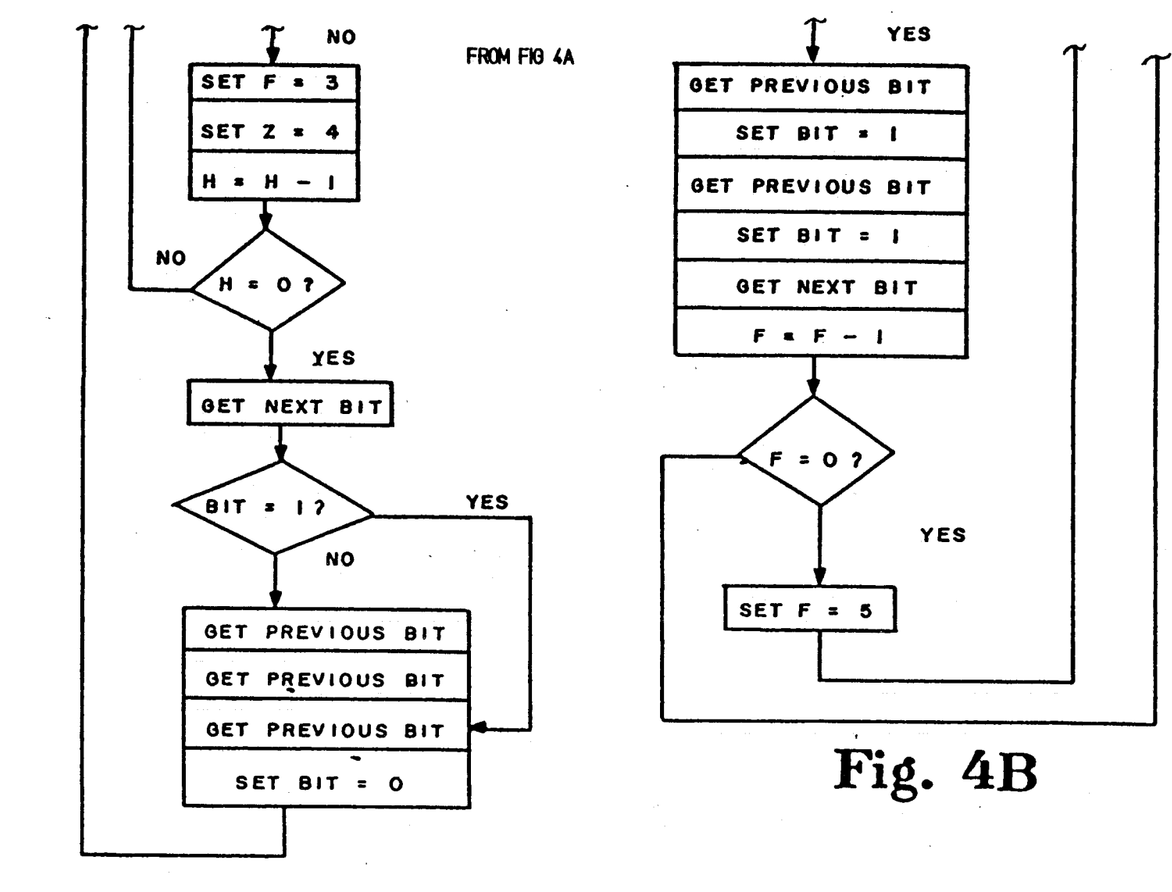
Figure 5A:
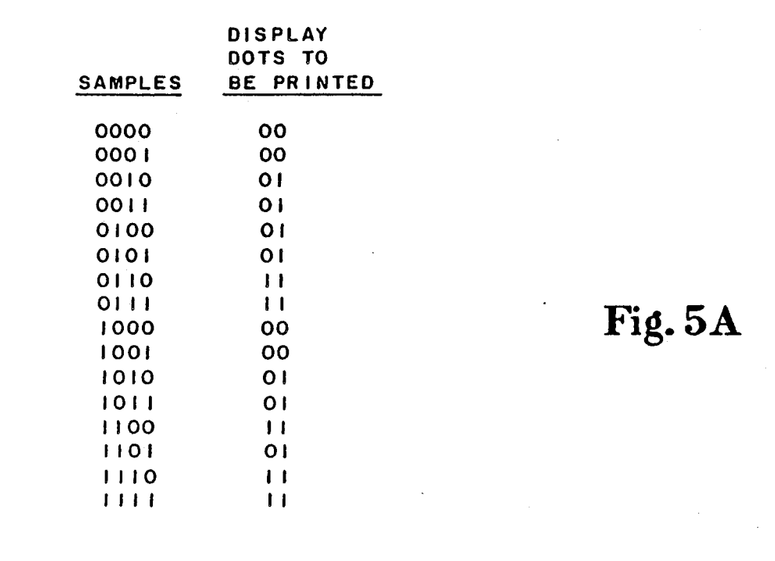
FIGS. 5A-5B are translation maps correlating four bit and three bit serial samples, respectively, which serial samples are generated using the dot boundary synchronization pattern, and digital representations of dots that are to be printed.
Figure 5B:
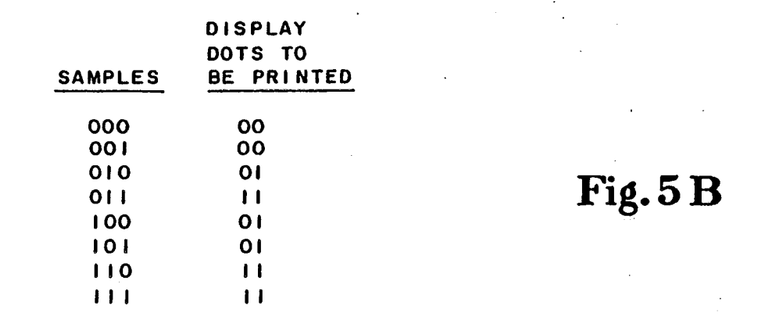

After the digital representations of the video information are stored in the memory 44 for a complete display screen, such digital information can be reconstructed into a format acceptable for printing by the standard printer 22. The preferred embodiment involves reconstructing the digital representations of video information to a standard graphics format. Such processing is accomplished using the microcontroller 48, which controls the execution of algorithms utilized in the reconstruction of the sampled video data. Flow diagrams are provided in FIGS. 3 and 4 illustrating the algorithms implemented. FIGS. 5A–5B illustrate translation maps or charts employed in using an algorithm that converts reconstructed sampled video information back to digital bits representative of video dots to be printed by the printer 22.

With reference initially to FIG. 3, the flow diagram illustrates the first algorithm employed in reconstructing the sampled video information stored in memory. This flow diagram results in the generation of a single row of binary ones and zeros, with the binary one in a column of the single row indicating that at least one of the rows of the sampled video information stored in the memory 44 has a dot boundary at that column location. A dot boundary indicates the end of the representation of one video dot and the beginning of the representation of an adjacent, but different, video dot, i.e., a video dot of different intensity. The determination and setting of dot boundaries is used in identifying where the reconstructed video dots occur. As the flow diagram of FIG. 3 indicates, the determination and setting of dot boundaries is basically accomplished by checking to determine whether each particular digital representation of the video information found in the memory 44 is different from the previous two digital bits representative of the video information. If there is no difference, it can be concluded that there is no video dot boundary. Conversely, if the current digital bit is different from the previous two digital bits, a setting or indication is provided to the effect that a dot boundary exists. The flow diagram of FIG. 3 is implemented for each row of the stored video data. For each column where a dot boundary is determined, a digital bit or binary one is provided for that particular column. Such steps are continued for each of the rows of digital bits stored in the digital memory 44. For each instance in which a dot boundary is defined for a particular column in the row, a binary one is provided in the corresponding column of the single row representative of video dot boundaries. In the case where there has already been a bit set in a particular column indicating a dot boundary, it need not be set again when, for another row of the video information, another dot boundary is found to be present for that same particular column. After each of the rows of the stored video information has been checked for dot boundaries, with the single row indicative of the dot boundaries being updated to indicate dot boundaries during the checking process, a single row of binary ones and zeros is the end result. This row identifies the dot boundaries for the video information of the entire display screen, with each binary one in the single row of dot boundaries indicating the location of a dot boundary for at least one of the rows of video information.

With reference now to FIG. 4, after dot boundaries have been identified, the steps of the flow diagram of FIG. 4 are executed to create a single row of binary ones and zeros constituting a dot clock synchronization pattern between recoverable dot boundaries. Because the sampled video information is not synchronized with the video dot clock, it is necessary to reconstruct the determined dot boundaries using the algorithm illustrated in FIG. 4. The steps of FIG. 4 basically include two major alternative paths. Along a first path, the bits of the video dot boundary previously determined are checked to determine whether there are a predetermined number of binary ones in sequence. If so, one of the previous bits of the dot boundary pattern is modified by setting it to a binary zero. The second or alternative path sets previous bits to a binary one when there is a sequential occurrence of a predetermined number of binary zeros in the dot boundary pattern. In carrying out the steps of the flow diagram of FIG. 4, each of the previously determined dot boundaries is accessed and used by the algorithm to generate therefrom the single row of binary ones and zeros constituting the dot clock synchronization pattern, which is defined between recoverable dot boundaries. In a preferred embodiment, the algorithm of FIG. 4 includes the use of a flag (F) which is utilized to set a bit in the dot clock synchronization pattern under certain circumstances, particularly when there is a significant, predetermined number of sequential binary zeros in the previously generated dot boundary row or pattern.

The dot clock synchronization pattern or modified dot boundaries is used with the sampled video information to reconstruct the video dots for printing. With reference to FIGS. 5A–5B, two translation maps or look-up tables are illustrated in which sampled reconstructed video data, represented by serially arranged binary ones and zeros is correlated with binary ones and zeros representing video display dots, which are to be printed. With regard to FIG. 5A, the samples each comprise four binary bits, while the samples of FIG. 5B each comprise three binary bits. The four video data samples are used in translation whenever the dot clock synchronization pattern indicates two possible positions for the start of a video dot. The three video data samples are used in translation whenever the dot clock synchronization pattern indicates only one possible starting position for the dot boundary. The binary ones and zeros representing the video dots include two binary bits. The binary zero/binary zero pattern represents a blank video dot to be printed, the binary zero/binary one represents a half bright video dot to be printed, and the binary one/binary one representation indicates that a full bright video dot is to be printed. As can be understood from the maps illustrated in FIGS. 5A-5B, each of the four and three bit patterns of the serial samples has a corresponding video dot. Consequently, it is necessary to identify the serial samples for a particular set of sampled video information stored in the memory 44 so that the corresponding video dots can be identified. This is accomplished using the previously generated dot clock synchronization pattern between recoverable dot boundaries. In particular, for each binary one of the dot clock synchronization pattern, corresponding digital bits of the sampled video information are accessed. A binary one in a particular column of the dot clock synchronization pattern means that the bit found in the corresponding column of each row of sampled video information is to be accessed and used, together with the next three succeeding or adjacent digital bits, in the case of four serial samples, and the next two succeeding samples or bits, in the case where three serial samples are to be utilized. These four or three bits are compared with the sample patterns found in the translation maps of FIGS. 5A-5B. The obtained or determined four or three bits are compared with each of the serial samples or bits constituting the translation maps. After a match is found, the corresponding video dots are known or determined. The determined video dots from the maps of FIGS. 5A-5B are utilized by the microcontroller 42 to transfer standard graphics formatted data across the RS 232 connection for printing by the standard printer.

Referring back to FIGS. 1 and 2, the system 20 also includes a switch block 58 comprising a number of switches to provide an 8-bit configuration. The switch block 58 transmits its input to the processing system 42 by means of the microcontroller 48. The user is able to select one of a number of different bit configurations using the eight switches of the switch block 58 so that the processing system 42 is able to provide a desired feature in connection with the printing operation. Specifically, activation of predetermined switches enables the processing system 42 so that it performs one or more of a number of pre-programmed functions including disabling generation of half bright intensity information or data. That is, when the half bright disable is activated, the digital logic used in providing alternating binary ones and zeros for storage in the memory 44 is controlled so that, instead of alternating binary ones and binary zeros, only binary ones are stored. As a consequence, only the full bright video dot is printed by the standard printer 22 using the standard graphics format. Other features controlled by the switch block 58 include the ability to cause the printing of the video information sidewise, or at an angle, with respect to the video display dots received from the display screen of the video information instrument 24, reversing the image of the video dots received, i.e. blank dots become full bright dots while full bright dots become blank dots for printing, and the repetitive printing of the same video information stored in the memory 44. As should be appreciated, other printing-related features could also be employed and user controller through activation of predetermined switches of the switch block 58.

The converting apparatus 26 also includes power circuitry 60, which receives its power by means of the RS-232 type connection circuitry 61, from the standard printer 22. As illustrated in FIG. 2, the power circuitry includes a power regulator 62 for outputting a predetermined, regulated voltage and which is applied to the microcontroller 48. The microcontroller 48 includes appropriate logic for controlling the application of power to the analog circuitry of the converting apparatus 26, such as the analog/digital converter 30 and the sync determining circuitry 32, as well as to the digital circuitry of the converting apparatus 26, including the programmable gate array 40 and the memory 44. Such control enables the microcontroller 48 to reduce the amount of power needed and consumed during the conversion of the digital representations of the video information to the standard graphics format, for example. With reference to FIG. 2, the microcontroller 48 includes output circuitry 66 for receiving a control voltage used in turning on/turning off power to the digital circuitry or the analog circuitry, which is depicted in FIG. 2. After the digital representations of the video information are stored in the memory 44 so that no current video information is being received from the video information instrument 24, the microcontroller 48 removes power from the analog/digital converter 30 and the sync determining circuitry 32 in order to conserve power. Power is, however, maintained to the programmable gate array 40 and the memory 44 so that the digital representations of the video information stored in the memory 44 can be converted for inputting to the standard printer 22. The use of power reduction circuitry and control is important because the standard printer 22 typically does not have sufficient power to provide power to all of the digital and analog circuitry and still permit proper system operation. Similarly, when the analog video signals are being converted to digital representations, digital circuitry not utilized in receipt and storage of the digital representations can be powered down, including the microcontroller 48 which is powered up intermittently to update time on its internal clock.

Figure 6:
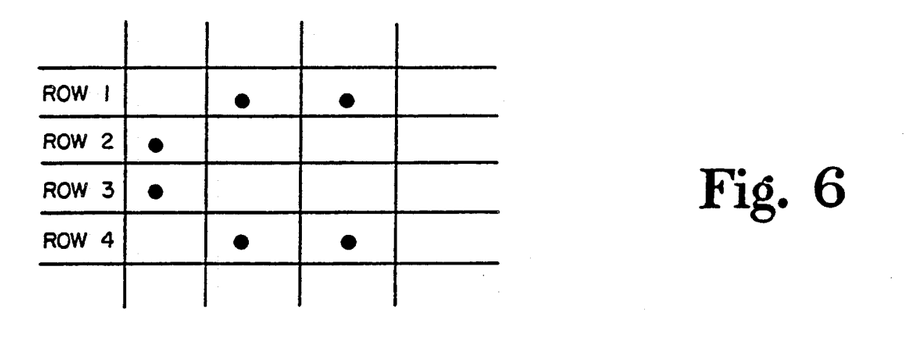
FIG. 6 is an illustration of a display of the letter "C" on a video display screen.

In conjunction with the operation of the system 20, reference is now made to FIGS. 6-12. These figures are intended to illustrate the operation of the system 20 when the letter "C" is being displayed on a video display screen of the video information instrument 24 and is to be printed on the standard printer 22. As can be seen in FIG. 6, the letter "C" is depicted using a number of full bright and blank video dots. As can be appreciated, however, for simplicity, not all of the blank video dots on the video display screen are being illustrated. That is, the letter "C" may be depicted in the center of the video screen and remaining portions of the video screen are presumed to be blank for purposes of this example.

With reference to FIGS. 7A-7D, the outputs of the analog/digital converter 30 are illustrated for each of the four rows associated with the video display screen of the video information instrument 24. Additionally, the vertical lines through the digital waveforms, representing the intensity levels of the video dots, illustrate the sampling of the received video information using the sampling frequency, which is greater than three times the display or video dot clock rate. Specifically, each vertical line indicates another sampling of the received video information.

Figure 7A:
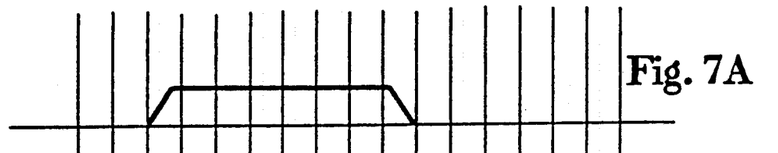
FIGS. 7A-7D illustrate intensity levels for the letter "C" of FIG. 6, with dots of different intensity levels being represented by different amplitudes of the signal waveform and with an indication of when the dots are sampled.
Figure 7B:
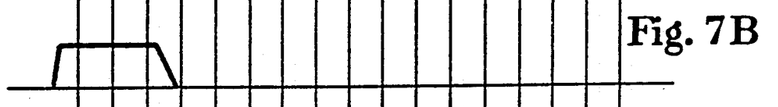
Figure 7C:
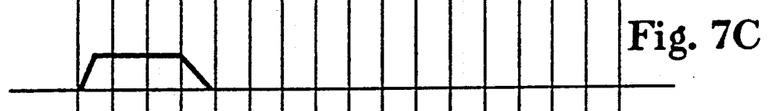
Figure 7D:
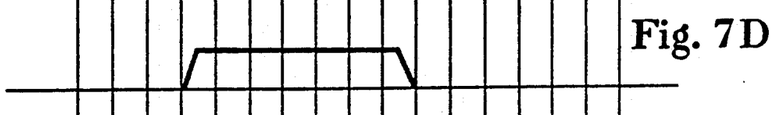

With more particular reference to FIG. 7A, it illustrates the digital representation of the two full bright video dots, together with the blank dots preceding and succeeding the two video dots. The full bright dots are illustrated by a positive, predetermined voltage level, while the blank dots are illustrated by the zero or reference voltage. FIG. 7A also illustrates that, with respect to the two full bright video dots, one was sampled four times, while the other was sampled three times so that there are seven vertical lines through the positive voltage level of the signal waveform indicating that, during the presence on the video display screen of the two full bright video dots, they were sampled a total of seven times. With respect to FIG. 7B, the positive voltage level indicates the occurrence of the single full bright video dot and the vertical lines through the positive voltage level indicate that it is being sampled by the programmable gate array 40. During the occurrence of the full bright video dot, it is sampled three times, as represented by the three vertical lines through the positive voltage level. With respect to FIG. 7C, it is similar to FIG. 7B in that the positive voltage level corresponding to the single full bright video dot is sampled three different times; however, due to the occurrence of the positive voltage level and the initial sampling thereof, the three samples are obtained at times different from when the samples were obtained for the full bright video dot of FIG. 7B. The offset occurrence of the digital representation of the full bright video dot of FIG. 7C from that of FIG. 7B is intended to illustrate this sampling difference. A similar sampling difference is illustrated by the digital representations and sampling conducted for the full bright video dots of row4 of the video display screen and illustrated by FIG. 7D. That is, because of the sampling difference, instead of the two full bright video dots being sampled a total of seven times, as was the case with the two full bright video dots of row1 of FIG. 6, the two full bright video dots of row4 were only sampled six times, as represented by the six vertical lines through the positive voltage level of FIG. 7D.

Figures 8A, 8B:
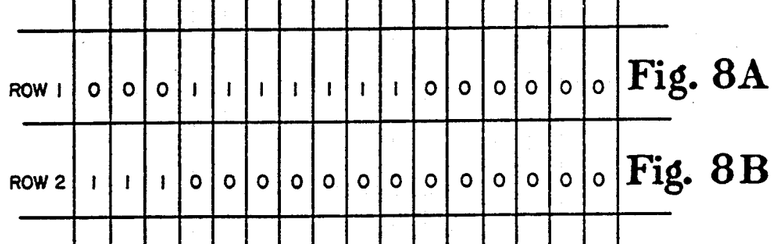
FIGS. 8A-8D are rows of digital bits making up a chart that illustrates the digital representations of the analog-represented dots of FIGS. 7A-7D.
Figure 8C:
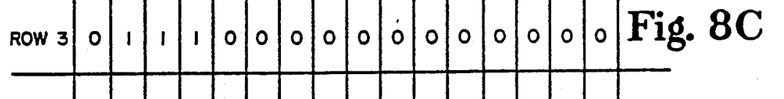
Figure 8D:
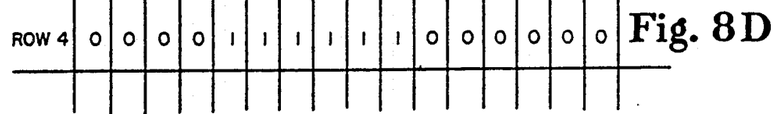

As previously discussed, during the sampling of the digital representations of the video information, the sampled binary video data is stored in the memory 44. With reference to FIGS. 8A-8D, the binary video information of FIG. 6 is represented for each of the rows of the video display screen, which digital representations are illustrated by FIGS. 7A-7D. For row1, corresponding to FIG. 7A, since the two full bright video dots were sampled a total of seven times, seven sequential binary ones are stored in the memory 44 at the proper locations, while binary zeros are stored on preceding and succeeding sides of the binary ones. Likewise, with respect to row2 and FIG. 7B, FIG. 8B illustrates three binary ones in the proper memory locations representative of the three times that the full bright video dot of row2 of FIG. 6 was sampled and when such sampling occurred. Row3 of FIG. 8C illustrates the sampling of the full bright video dot of row3 of FIG. 6, as well as indicating that the three samples were taken at relatively different times from the sampling of the full bright video dot of row2. Row4 of FIG. 8 illustrates that the two full bright video dots of row4 of FIG. 6 were only sampled six times, as represented by the six binary ones, in contrast to the seven times that the two full bright video dots of row1 were sampled. As with row1 and row2 of FIGS. 8A and 8B, row3 and row4 of FIGS. 8C and 8D, by the location of the binary ones, indicate when positive voltage levels were sampled, corresponding to the full bright video dots. Consequently, the binary ones and zeros of FIGS. 8A-8D illustrate the digital representations of the video information stored in the memory 44, in accordance with when the outputs of the analog/digital converter 30 were sampled by the programmable gate array 40.

After the digital representations of the video information are stored in the memory 44 for a complete video display screen, the microcontroller 48 then initiates the algorithms for converting the stored video data to a format acceptable to the standard printer 22, as previously discussed in connection with FIGS. 3-5.

Figure 9A:
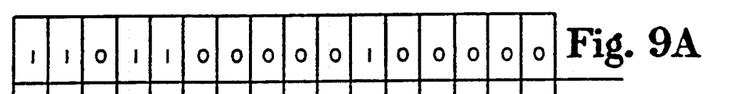
FIGS. 9A-9C illustrate an identification of dot boundaries, modified dot boundaries (dot boundary synchronization pattern) and the number of serial samples to be obtained for translation to display dots, as well as the bit position to start translation, respectively, for the video display screen of FIG. 6.

In determining the video dot boundaries, each of the binary bits in the memory 44 for the letter "C", and illustrated in FIGS. 8A-8D, is checked and compared with the previous two bit samples, in accordance with the algorithm of FIG. 3. With reference to the first column of each of the four rows illustrated in FIGS. 8A-8D, it is determined that, except for row2, there is a binary zero in column 1, just as there is a binary zero in the previous two columns. That is, the two binary bits preceding the binary zeros of rows 1, 3 and 4 are binary zeros. With respect to row2, however, the two preceding bits are binary zeros while column 1 of row2 has a binary one thereby indicating a dot boundary. Because a dot boundary exists in at least one of the rows, the dot boundary pattern for column 1 is set to a binary one and this is reflected in FIG. 9A, which is a representation of dot boundaries for the digital bits of FIGS. 8A-8D, which represent the video information of FIG. 6. Referring to column2 of FIG. 8A, it is determined that a dot boundary exists in column2 of row3 in which the previous two binary bits are logical zeros while the binary bit of column2 of row3 is a binary one. Consequently, the second column of the dot boundary row of FIG. 9A is set to a binary one. In making the comparison in accordance with the algorithm of FIG. 3 for column3 of the rows of FIGS. 8A-8D, it is determined that no dot boundary exists because each of the binary bits of column3 is not different from both of the previous two binary bits in the respective rows. Consequently, column3 of the dot boundary row is a binary zero. In comparing the binary bit of column4 of each of the rows with each of their respective two previous binary bits, it is determined that a dot boundary exists in column4 of row1 and column4 of row2. In row1, the binary one of column4 differs from the two previous binary zeros of row1 while in column4 of row2, the binary zero differs from the previous two binary ones. Consequently, a binary one is set in column4 of the dot boundary row. A dot boundary also is determined in column5 due to the dot boundaries that exist in rows 3 and 4 of column5. The last dot boundary to be set to a binary one occurs in column11 of row1 where the binary zero differs from the previous two binary ones. The remaining bits of the dot boundary pattern for the letter C of FIG. 6 are binary zeros since there is no dot boundary at any of those columns in any of the rows of FIGS. 8A-8D.

After the dot boundary row has been established, the algorithm and steps of FIG. 4 are next implemented to provide the dot clock synchronization pattern between the previously determined recoverable dot boundaries.

In particular, each of the bits of the dot boundaries of FIG. 9A are accessed and processed using the steps of FIG. 4 to determine whether or not any of the bits of FIG. 9A are to be modified. Starting with the binary one of column1 of FIG. 9A, the steps of the flow diagram of FIG. 4 are implemented. Since this bit is a binary one, the next step involves obtaining the previous bit, which is a binary zero. The variable Z is set equal to 4 and the variable H is set equal to 3. The next bit is obtained which is the binary one of column 1 of the dot boundary row. Since this binary bit is not a binary zero, the flag F is set to 3, the variable Z is set to 4 and the variable H becomes 2 (3−1). Since the variable H is not equal to 0, the next bit in the dot boundary row is obtained. Since the next bit is a binary one and not a binary zero, the same path of the flow diagram of FIG. 4 is implemented. Subsequently then, when the next bit is obtained, since the next binary bit is a logical zero, the second path of the flow diagram of FIG. 4 is implemented. Specifically, the variable Z becomes 3 (4−1). Since the variable Z is not equal to 0, the variable H is set to 3 and the next bit is obtained from the dot boundary row. This is the binary one of column4 of the row or pattern illustrated in FIG. 9A.

Implementation of the steps of FIG. 4 are continued with none of the binary bits of FIG. 9A being changed until the binary zero of column9 of FIG. 9A is accessed. When this occurs, the variable Z now equals 0 so that the previous bit is obtained and set equal to a binary one. The previous bit is the binary zero of column8. Consequently, the binary zero of the dot boundary row of FIG. 9A becomes a binary one in the dot clock synchronization pattern between recoverable dot boundaries illustrated in FIG. 9B. Similarly, proceeding with the steps of FIG. 4, the previous bit of column7 of the dot boundary row is obtained and is now set to a binary one. Continuing with the steps of the flow diagram of FIG. 4 and applying it to the remaining binary bits making up the dot boundary row of FIG. 9A results in no change in the pattern from those remaining bits in FIG. 9A. Consequently, the only changes from the dot boundary row of FIG. 9A, in the pattern generated and illustrated in FIG. 9B, are found in columns 7 and 8 in which the previous binary zeros were set to binary ones.

Figure 9B:
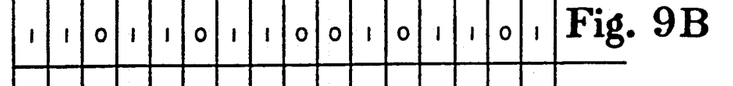

After the pattern of FIG. 9B is generated, the reconstructed video display dots can be determined using the translation maps of FIGS. 5A–5B. To determine the reconstructed display dots to be printed by the printer 22, each of the rows of the stored sampled video data of FIGS. 8A–8D is accessed to obtain the serial or sequential samples.

Figure 9C:
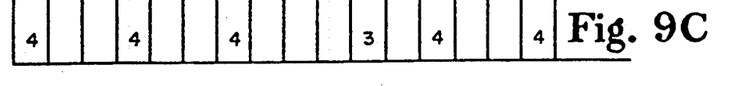
Figures 10A, 10B:
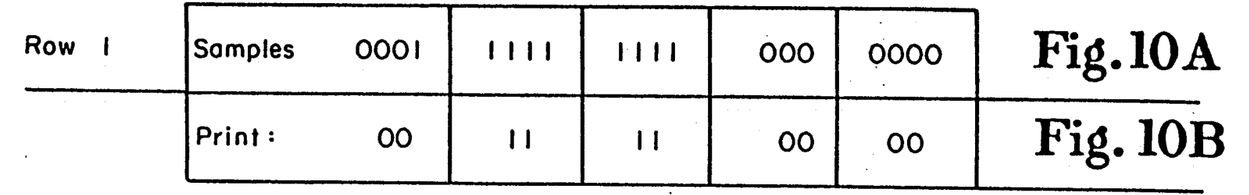
FIGS. 10A-10H illustrate the determined serial samples and the corresponding display dots to be printed using the translation maps of FIGS. 5A-5B for the four rows of the chart of FIGS. 8A-8D.
Figures 10C, 10D:
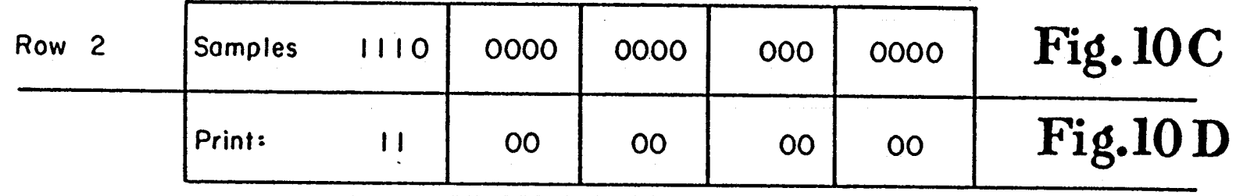
Figures 10E, 10F:
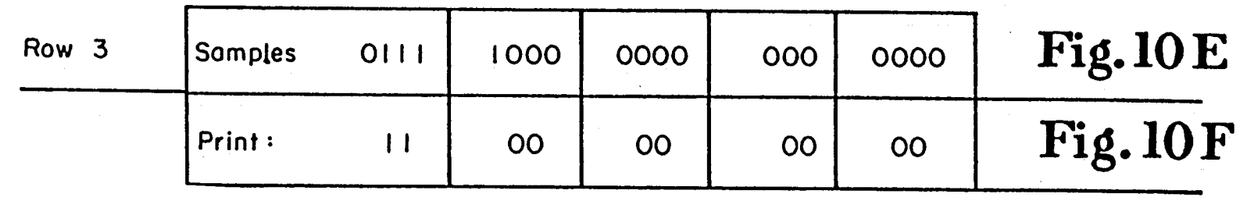
Figures 10G, 10H:
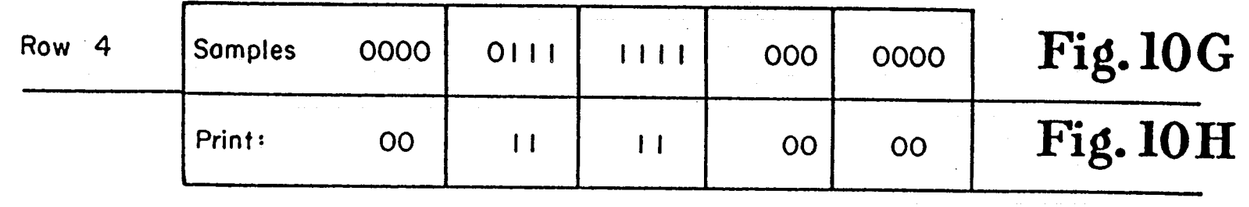
Figure 11:
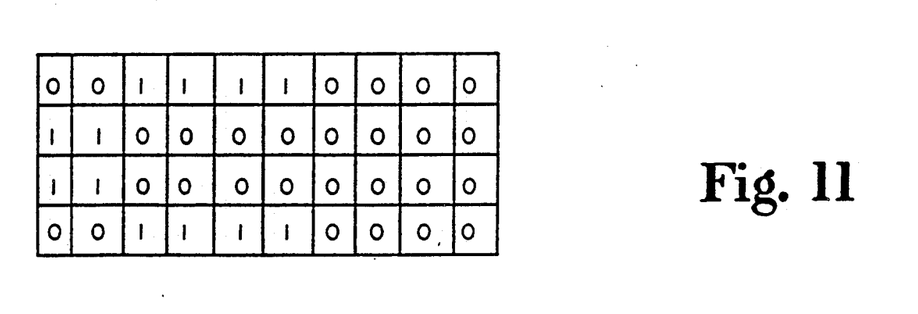
FIG. 11 is a chart comprised of the display dots to be printed of FIGS. 10B, 10D, 10F and 10H.

In conjunction with identifying the samples to be used to determine the video display dots to be printed, reference is made to FIGS. 10A–10H, together with the maps of FIGS. 5A–5B. In particular, FIG. 9C indicates the number of samples to be obtained from FIGS. 8A–8D and also the position in the row where the sample taking is to start. Using the information provided in FIG. 9B, it is seen that the first dot boundary is at bit position 1 of FIG. 9B and, because there are two possible starting positions indicated by the binary ones in bit positions 1 and 2, the samples to be utilized comprise four bits beginning with the first bit of each of the rows of FIGS. 8A–8D. The number of samples to be utilized is indicated in FIG. 9C. With respect to row1 of the video data, as seen in FIG. 10A, the first four bits include three binary zeros and a binary one (the first four bit positions of FIG. 8A). Reference to the table of FIG. 5A indicates that such binary samples correlate with two binary zeros, which is a video representation of a blank dot.

The same analysis is conducted using the other dot boundaries found in FIG. 9B. The next dot boundary is in bit position 4. Since there is also a dot boundary identified in bit position 5, there are also two possible starting positions for this dot boundary. Consequently, serial samples of four bits must be obtained starting with bit position 4. This step results in four binary ones being obtained. Correlating the result of these serial sampling with the map of FIG. 5A results in the identification of a binary one and binary one display dot representation, which is indicated in FIG. 10B. Continuing with the evaluation of row1 of the video data, there is another dot boundary indicated in bit position 7, which evaluation results in a determination of a binary one and binary one video dot representation, which is a full bright state. The next dot boundary is found in bit position 11. Since there is a binary zero in bit position 12, there is only one possible starting position for the dot boundary. Consequently, the serial samples only comprise three bits, starting with bit position 11 of the rows of video data. Reference is made to the three bit serial samples of FIG. 5B to determine the corresponding display dot representation, which is a binary zero and binary zero (blank dot).

Figure 12:
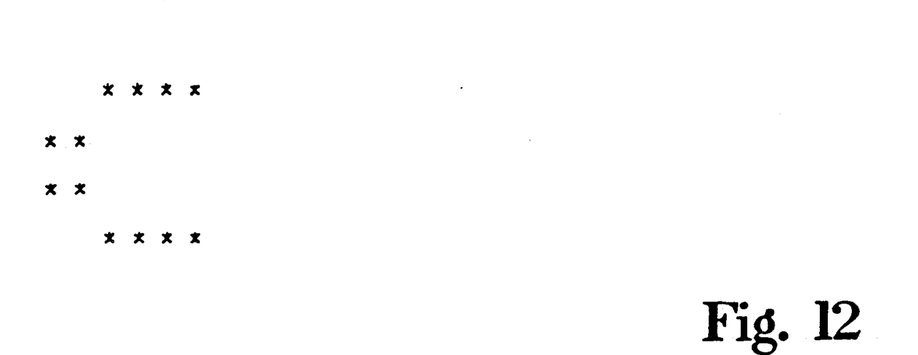
FIG. 12 illustrates a printer hardcopy recording of the video display screen of FIG. 6.

The foregoing analysis is applied to each of the other rows of the sampled video data to determine corresponding display dot representations. The corresponding display dots are identified as FIGS. 10D, 10F and 10H, as well as FIG. 10B. Arranging the determined or correlated display dots in accordance with the rows of video data results in the chart or representation found in FIG. 11. The necessary information has now been obtained for printing the video information, based on the reconstructed display dots found in the chart of FIG. 11. Specifically, such information is utilized to provide an input to the conventional printer 22 to cause printing by the printer 224 of the display dots of FIG. 11. With reference to FIG. 12, the letter C is illustrated, as it would be printed by the conventional printer 22 in which the binary zeros are printed or displayed as blank dots and the binary ones are printed as full bright dots in the form of asterisks. As can be seen in FIG. 12, the printing of the information found in FIG. 11 results in the representation of the letter "C."

Based on the foregoing description, a number of advantages of the present invention are readily seen. An apparatus is provided for enabling a conventional printer to print video information. As a consequence, the necessity of a specialized video printer has been eliminated. In a preferred embodiment, the sampling of the video information is not synchronized to the display or occurrence of the video information received from the video instrument. Consequently, a more accurate representation of the sampled video information is obtained and subsequently reconstructed. The apparatus for converting the video information can be made relatively inexpensively and used with currently available standard printers.

The foregoing description of the invention has been presented for purposes of illustration and description. Further, the description is not intended to limit the invention to the form disclosed herein. Consequently, variations and modifications commensurate with the above teachings, in the skill or knowledge of the relevant art, are within the scope of the present invention.

The embodiments described hereinabove are further intended to explain best modes known of practicing the invention and to enable others skilled in the art to utilize the invention in such, or other, embodiments and with the various modifications required by their particular applications or uses of the invention. It is intended that the appended claims be construed to include alternative embodiments to the extent permitted by the prior art.

What is claimed is:

1. A system for printing video related information using a standard printer that is also adapted to print non-video related information including hexadecimal information and text information, comprising:
   an instrument for generating video information;
   a standard printer adapted to print standard graphics formatted information, hexadecimal information and text information; and
   means responsive to said instrument for converting said video information, including means for determining and converting different levels of signal intensity, into a predetermined format acceptable to said standard printer and for outputting said predetermined formatted video information to said standard printer.

2. A system, as claimed in claim 1, wherein:
   said means for converting electrically communicates with said standard printer but is housed exteriorly from said printer.

3. A system, as claimed in claim 1, wherein:
   said means for converting includes power circuitry means for providing power to remaining portions of said means for converting using power received from said printer.

4. A system, as claimed in claim 1, wherein:
   said means for converting includes means for obtaining sync information being inputted by said instrument.

5. A method for converting video information to a predetermined format for printing by a standard printer capable of printing information other than video information, comprising:
   sampling video information at a rate greater than the rate at which the video information changes, said video information being defined using dots having different levels of intensity wherein said levels of intensity include a substantially zero level of intensity;
   identifying sync information using the sampled video information;
   comparing the video information with predetermined signal levels to generate digital representations for each of said dots of the video information;
   storing said digital representations of said dots;
   determining, subsequently, dot boundaries of said stored digital representations;
   determining a dot synchronization pattern for said sampled video information using said dot boundaries;
   defining serial samples using said dot synchronization pattern;
   correlating said serial samples with display dots being defined by levels of intensity; and
   using said correlated display dots to print video information corresponding to said sampled video information.

6. A system, as claimed in claim 1 wherein:
   said means for determining includes means for comparing a signal representative of video information with a predetermined magnitude corresponding to a predetermined intensity of video information.

7. A system, as claimed in claim 1, wherein:
   said means for converting includes memory means for storing digital representations of video information received from said instrument.

8. A system, as claimed in claim 1, wherein:
   said means for converting includes processing means for determining dot boundaries associated with video information received from said instrument.

9. A system, as claimed in claim 8, wherein:
   said means for converting includes processing means for determining a dot clock synchronization pattern using said dot boundaries in order to reconstruct said video information, which was received from said instrument.

10. A system, as claimed in claim 9, wherein:
    said means for converting includes processing means for determining display dot information using said reconstructed video information.

11. A system, as claimed in claim 3, wherein:
    said means for converting includes means for identifying intensity levels of said video information and said means for converting also includes processing means communicating with said power circuitry means wherein said processing means controls power consumption of said means for identifying.

12. A system, as claimed in claim 1, wherein:
    said printer is an Epson-compatible printer.

13. A system, as claimed in claim 1, wherein:
    said instrument is a protocol analyzer.

14. A system, as claimed in claim 1, wherein:
    said video information is definable by a plurality of dots having different levels of intensity wherein said different levels of intensity include full bright, half bright and blank.

15. An apparatus adapted to be used with an Epson-compatible printer for printing video-related information in which the Epson-compatible printer is not capable of printing the video-related information without the apparatus, comprising:
    first means responsive to the video-related information for obtaining sync information therefrom;
    second means responsive to the video-related information for determining levels of intensity associated with the video-related information;
    memory means for storing digital representations of the video-related information;
    processing means communicating with said memory means for converting the video-related information to a format adapted to be printed by the Epson-compatible printer; and
    means for housing at least one of said first means, said second means, said memory means and said processing means.

16. An apparatus, as claimed in claim 15, wherein:
    said means for housing is physically separate from but is adapted to be in electrical communication with the Epson-compatible printer.

17. A method for converting video information to a predetermined format for printing by a standard printer capable of printing information other than video information, comprising:
    receiving video information including sync information;
    identifying said sync information;
    determining levels of intensity of the video information;

generating digital representations of the video information;

storing said digital representations;

converting said digital representations to formatted data acceptable for printing by the standard printer; and outputting said formatted data to the standard printer for printing.

18. A method, as claimed in claim 17, wherein:

said step of receiving video information includes sampling video information at a rate greater than the rate at which the video information changes.

19. A method, as claimed in claim 18, wherein:

said step of sampling includes sampling at a rate at least three times greater than the rate at which the video information changes.

20. A method, as claimed in claim 17, wherein:

said step of converting includes determining dot boundaries using the received video information.

21. A method, as claimed in claim 20, wherein:

said step of determining dot boundaries includes checking for the sequential occurrence of a plurality of digital representations of the video information having the same binary state.

22. A method, as claimed in claim 17, wherein:

said step of converting includes determining a dot clock synchronization pattern using dot boundaries in order to reconstruct sampled video information.

23. A method, as claimed in claim 22, wherein:

said step of determining said dot clock synchronization pattern includes checking digital bits defining said dot boundaries for the sequential occurrence of binary ones and binary zeros and setting a bit to one of a binary one and a binary zero, depending upon the sequential occurrence of a predetermined number of digital bits having the same binary state.

24. A method, as claimed in claim 17, wherein:

said step of converting includes determining display dot information using reconstructed sampled video information.

25. A method, as claimed in claim 24, wherein:

said step of determining display dot information includes accessing a map for correlating serial samples to display dots of predetermined intensity levels.

26. A method, as claimed in claim 17, further including:

reducing power to circuitry that performs the steps of identifying said sync information and determining said levels of intensity of the video information during the step of converting said digital representations of the video information to said formatted data.

* * * * *